United States Patent
Herman

(12) United States Patent (10) Patent No.: US 6,877,115 B2
Herman (45) Date of Patent: Apr. 5, 2005

(54) INTERACTIVE ON-LINE DIAGNOSTICS FOR PRINTING

(75) Inventor: Peter Q. Herman, Antony (FR)

(73) Assignee: Sinapse Graphic International, Saint Aubin Cedex (FR)

( * ) Notice: Subject to any disclaimer, the term of this patent is extended or adjusted under 35 U.S.C. 154(b) by 466 days.

(21) Appl. No.: 09/893,412

(22) Filed: Jun. 29, 2001

(65) Prior Publication Data

US 2002/0002449 A1 Jan. 3, 2002

Related U.S. Application Data

(60) Provisional application No. 60/215,074, filed on Jun. 30, 2000.

(51) Int. Cl.[7] .............................................. G06F 11/32
(52) U.S. Cl. .......................... 714/46; 714/25; 714/26; 101/483; 101/484; 101/494
(58) Field of Search ............................. 714/25, 26, 46; 101/483, 484, 494

(56) References Cited

U.S. PATENT DOCUMENTS 5,214,653 A * 5/1993 Elliott et al. .................. 714/46
5,515,503 A * 5/1996 Shimomura et al. .......... 714/26
5,539,869 A * 7/1996 Spoto et al. .............. 715/500.1
6,244,174 B1 * 6/2001 Sirowitzki et al. .......... 101/483
6,608,932 B1 * 8/2003 Rasmussen et al. .......... 714/46

* cited by examiner

Primary Examiner—Robert Beausoliel
Assistant Examiner—Joseph D Manoskey
(74) Attorney, Agent, or Firm—Dickstein Shapiro Morin & Oshinsky LLP

(57) ABSTRACT

A diagnostic system for a flexographic printing press operation. The diagnostic system includes a generic database containing problem solving data and a specialized database containing customized, user-specific operations data. The generic database can be stored centrally, while the specialized database is stored locally. An interactive data entry interface permits an operator to indicate print faults and access the databases. The system generates possible solutions to the print faults based on the information in the databases and the fault indicated by the operator. Once a solution is chosen, the databases are updated to further enhance the knowledge available to the system.

17 Claims, 5 Drawing Sheets

FIG. 5

PRINT FAULT DIAGNOSTIC HELP

| COMPONENT | VARIABLE | VALUE | PRINT FAULT |
|---|---|---|---|
| SUCTION DEVICE | DATE OF VALIDATION EXPIRED | TOO HIGH | EXPLOSION |
| SENSOR | DENSITY % VAR. COATED UNCO | TOO LOW | LFL PROBLEM |
| PRINT UNIT | DRYING | | START SEQUENCE |
| SUBSTRATE BEFORE PRINTING | FOAMING | | SPLASHING |
| INK ON PRESS | INK FLOW | | FLOODING |
| INK-FEED SYSTEM | INK FORMULATION | | STRIATIONS |
| pH & VISCOSITY SEN | LEVEL OF INK | | HALO |
| INK FLOW IN | pH | | INK STARVATION |
| INK FEED PUMP | pH | | BOUNCE |
| RETURN PUMP | REAL RGB VALUE OF THE COLO | | PICKING |
| INK FILTER AND MAGN | SECOND INK IS DISSOLVING THE | | TRACKING |
| INK HOSE | TEMPERATURE | | WRONG DENSITY |
| INK TRAY | VISCOSITY | | |
| FOUNTAIN ROLL | VISCOSITY | | |

PRESS CS

PRINT FAULT: HALO
FAULT CAUSE: PRINTING PLATE: HALO ANILOX GEAR: TOO HIGH

COMMENT   DEFINITION   MENU

INTERACTIVE ON-LINE DIAGNOSTICS FOR PRINTING

This application claims the benefit of U.S. Provisional Application Ser. No. 60/215,074, filed Jun. 30, 2000.

BACKGROUND OF THE INVENTION

1. Field of the Invention

The present invention relates to interactive systems for diagnosing fault conditions in a printing press operation.

2. Brief Description of the Related Art

A flexographic simulator and diagnostic system is disclosed in U.S. patent application Ser. No. 09/773,560, having common assignment with the present application, the contents of which are incorporated herein by reference in their entirety.

Flexography is a complicated printing process using flexible "plates" to transpose an inked imaged onto different substrates. Ordinarily, years of training and experience are required in order to become proficient in operating flexographic printing presses. It would be desirable to provide a flexographic printing press diagnostic system for training new operators, and for assisting skilled operators in diagnosing printing problems

SUMMARY OF THE INVENTION

The present invention provides a diagnostic system for a printing press operation. The diagnostic system includes a generic database containing problem solving data and a specialized database containing customized, user-specific operations data stored on a data storage means. An interactive data entry interface permits operators to indicate print faults and access the databases. The system generates possible solutions to the print faults based on the information in the databases and the fault indicated by the operator.

Print faults diagnosis begins with an operator providing a problem description by way of the data entry interface. Problems can be described based on the print fault itself or the part of the printing process in which the print fault occurred. Print fault diagnosis can take various approaches, including symptomatic descriptions, fault classification, or image-based visual matching. Diagnosis based on the part of the process involved will focus on printing press components and subcomponents, and the process variables and values involved.

Data related to printing press faults preferably are organized and displayed in a hierarchical fashion. The operator can select the number of levels to be provided in the hierarchy for any given diagnostic session. The session continues with the problem description taking place as an interactive dialogue until the fault has been adequately indicated.

Once the operator has described the fault, the system further accesses the generic and specialized databases, determines possible causes of the problem, and proposes solutions. Based on the options provided, the operator can either further define the fault, or select a solution from the provided list of possible remedial actions.

The diagnostic system can be provided as a stand-alone installation, or the system can be integrated into a simulated or full-production printing press. In those instances where the operator has submitted a print job through the data entry interface, the system's processing unit can precalculate the appearance of the print jobs based on the parameters provided.

The generic and specialized databases provide different levels of access to the system data. The generic database preferably is centrally located and can be accessed by any operator. The generic database contains information general to the printing industry, and relates process elements and condition to potential print faults.

The specialized database generally is located locally, such as at the user site, and can include simulated interfaces for particular presses at the user site, maintenance histories of those presses, and multimedia procedures for control and repair of the presses. In addition, job tickets with recommended production values can be stored in the local database, as well as data on past problem frequencies and recommended solution strategies. Further specialization can include press diagrams, repair procedures, supplier recommendations, and contact information to any element of the hierarchy, such as suppliers and manufacturers.

Other features and advantages of the present invention will become apparent from the following description of the invention which refers to the accompanying drawings.

BRIEF DESCRIPTION OF THE DRAWINGS

FIG. 5 is a print fault diagnostic screen based on press components according to the present invention.

DETAILED DESCRIPTION OF THE PREFERRED EMBODIMENTS

Figure 1:
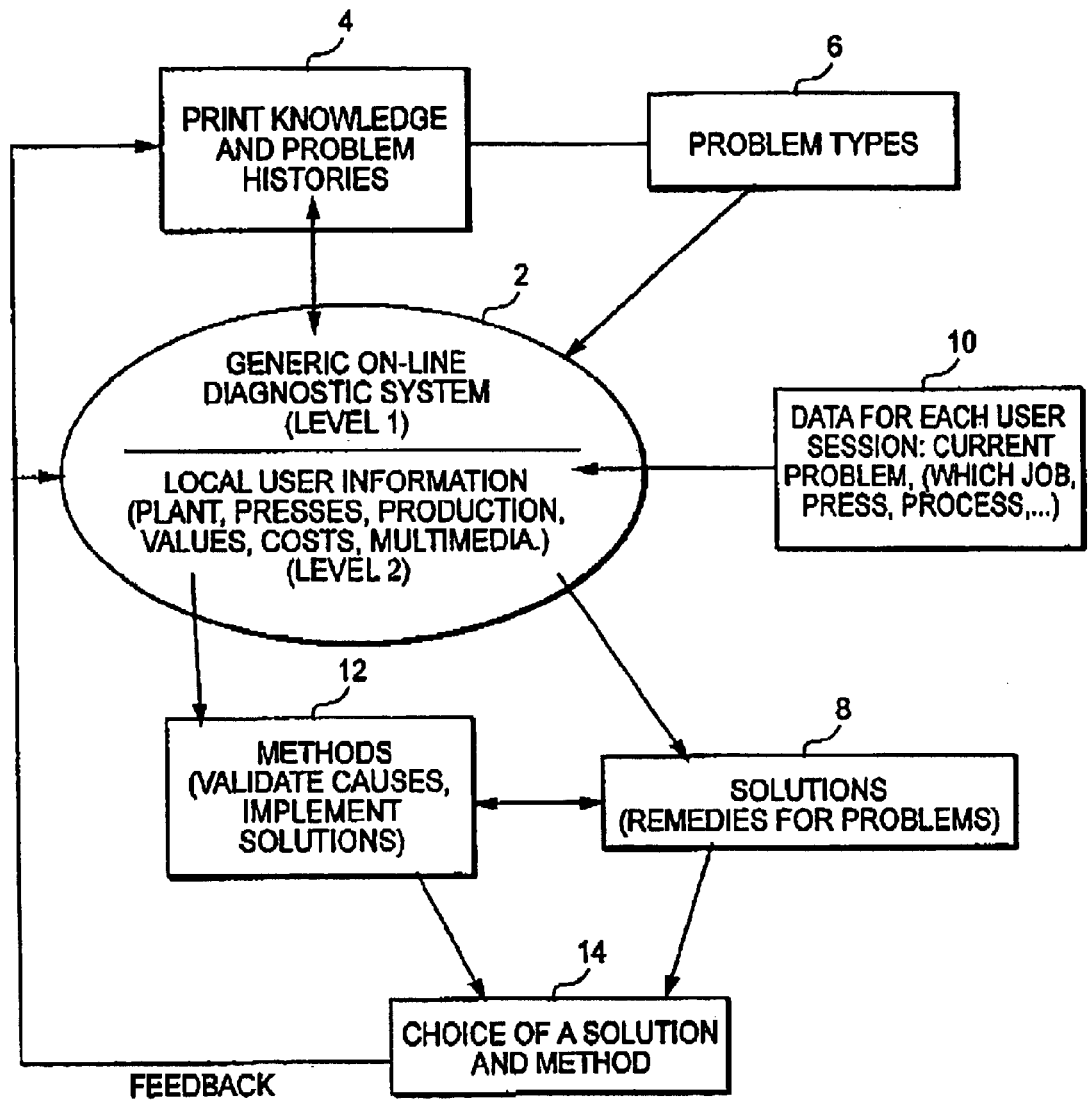
FIG. 1 is a system data flow diagram illustrating access and enhancement of databases according to the present invention.

Referring initially to FIG. 1, an overview of data flow for a diagnostic system of the present invention is illustrated. The system centers around databases 2 which are accessed and updated during each diagnostic session.

Two levels of data and user access are provided in the system. Level 1 includes centralized data containing generic problem solving knowledge. This data is general for the printing industry, and can be augmented by more specialized knowledge about subsets of production problems 4 and problem types 6. This level relates process elements and conditions to potential print faults. Visual representations of print faults are integrated to make "image-based" diagnostics a viable problem-resolution strategy. The data can be stored centrally and accessed over a local area network, a wide area network, the Internet, etc.

Level 2 data includes user specific (local) data preferably stored at the user site. This data can include simulated interfaces for the specific presses at the user site, maintenance histories, and multimedia procedures for control and repairs of the user's presses. Individual job tickets with recommended production values also can be stored and accessed. The local database also incorporates data on past problem frequencies and recommended solution strategies 8. User data entry 10 allows information for each user session to be entered into the local database.

The system generates possible problem resolution methods 12 and presents them to the operator based on fault-identifying information provided. Once a solution method is chosen, the result of the diagnostic session is fed back and incorporated into the database for future reference. Thus, the system builds upon past experience to develop and refine its knowledge base.

The Level 1 and Level 2 databases can include simple text-based data as well as multimedia (video, text) and hyperlinks to augment the information provided to the operator. Generic process data stored in the Level 1 database includes hierarchical press and process models. The hierarchical models preferably have a top component level, followed by press variables, values, potential print problems, attribute-based descriptions, and recommended analysis/solution methods.

The Level 1 database also will include a print fault library including graphics showing samples of print fault problems and cross-references with the press and process model.

The specialized Level 2 databases house supplementary data provided in a hierarchical structure and include local information such as supplier data and user data. Supplier information (e.g., ink manufacturers/suppliers) can be specified with reference to process components (e.g. ink types, printing presses), and can include sub-types and specific product references, cross-references with other process components, recommended production values, FAQ (frequently asked Questions/Answers), a history of problem types, and suggested solutions or validation methods. User information (production site, or multi-site producer) is specified with reference to local plant and equipment information such as presses, jobs, including images, materials, recommended production values, known problem histories, problem/solution frequencies, and recommended methods related to each press, job, and client.

Figure 2:
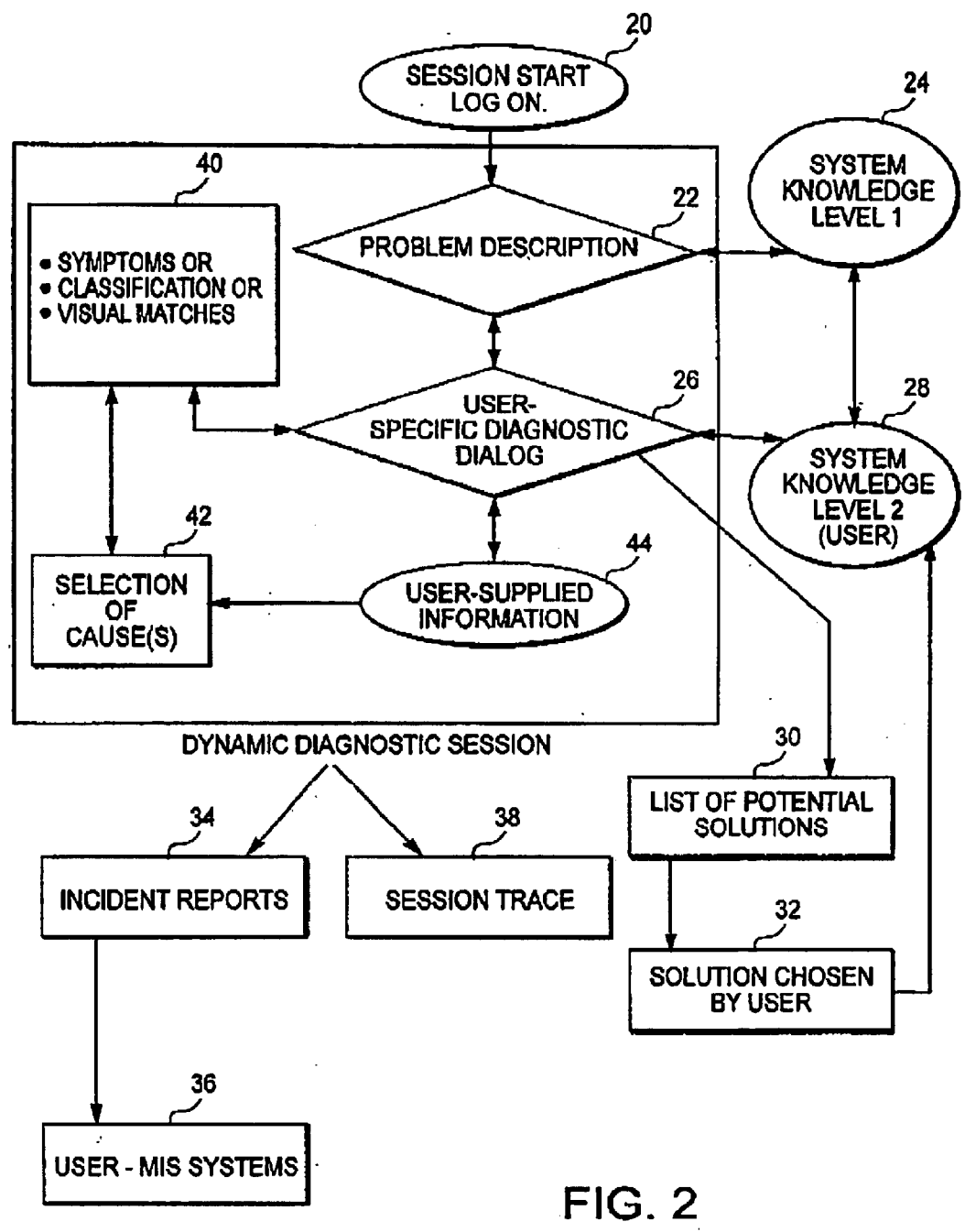
FIG. 2 is a flow chart of a diagnostic session according to the present invention.

Referring to FIG. 2, a flow chart of a typical diagnostic session is shown. Once an operator has logged on to the system 20, the session proceeds with the operator describing a print fault problem 22. In those cases for which a general description is sufficient to characterize the problem, access to the Level 1 database 24 may be sufficient for the system to provide a proposed solution method. When a more detailed description is required, the interactive session continues to a user-specific dialogue 26, described further below, in which access to the Level 2 local database 28 is required. Once the problem has been described, a list of potential solutions 30 is provided. The solution chosen by the operator 32 is fed back into the knowledge base for future reference. Upon completion of the diagnostic session, incident reports 34 are generated and provided to management information systems 36 as required, and session traces 38 are generated for quality control purposes.

Using the user-specific diagnostic dialogue 26, the print fault problem can be indicated to the system in various ways depending on the operator's level of print knowledge and the type of problem encountered. The three preferred modes of operator interaction 40 according to the present invention include a symptomatic approach, a classification approach, and an image-based approach, described further below. Under each type of approach, the diagnostic system processes the operator indications and accesses the databases to provide a list of possible causes 42 that most closely match the faults that are indicated by the operator. A further refinement of this step is described in more detail below. Based on the dialogue and other user-supplied information 44, a list of solution methods 30 are provided for selection by the operator.

The symptomatic approach uses common terms that do not require particular expertise in printing operations. Accordingly, terms describing the print fault are entered or selected by the operator, such as "too dark," "badly folded," "color not aligned," etc.

The classification approach uses the technical vocabulary of the industry. Terms such as "dot gain," "circumferential slur," "break at chopper fold," "lead edge halo," etc., known to those of skill in the art, are used to indicate the print fault problem.

Using the image-based approach, the system displays several representations of faults, and the operator chooses the three closest, for example. New faults are displayed, and the "three-closest" are updated. When the operator is satisfied with the final selection, the system displays the fault descriptions and the list of causes (process problems) common to all. This approach is particularly useful if the operator has entered the real print job into the system, thereby providing the system with more detailed information regarding the process values.

A refinement of the image-based approach is referred to as the "identikit" method. The operator describes the symptoms and the system adjusts the visual representation until the image matches the real-world appearance of the print job. This method can be used by relatively inexperienced personnel.

During the selection of causes step 42, the diagnostic system takes the list of potential process problems ("causes") produced by the initial operator interactions, and tries to narrow down the list and suggest what to check and in what order. The order can be predetermined based on various factors as discussed below.

The extent of the interaction in this stage depends on the operator's available time, level of sophistication, and the level of site-specific information that has been entered about the production jobs, consumables, and values. Another factor influencing the contents of the dialog is the level of permitted access to supplier or industry databases.

Some sample diagnostic dialogs follow:
Sample Dialog A
  A set of generic control and remedial actions for each of the causes
  Example: CHECK X, if value is not right then CORRECT by doing Y
  Production Cost
  Each of these actions can be edited by the user to reflect the time and cost of the CHECK and CORRECT on the press, so that potential remedies can be sorted by cost. These costs can also come from supplier or industry databases.
Sample Dialog B
  A more extensive dialog based on the process variables underlying each cause
  Example: poor color→insufficient ink transfer→anilox volume too low→pH incorrect OR wrong roller, OR . . . .
  The operator is prompted at each step to check the next level of the process so as to make sure the real underlying cause is identified. In the example above, if the pH is bad, the user will understand that the anilox is not the cause of the problem.
  The sequence in which the system proposes to check the potential causes can be user defined. Examples include lowest cost first, most frequent problem (user, supplier, or industry weightings), etc.

Figure 3:
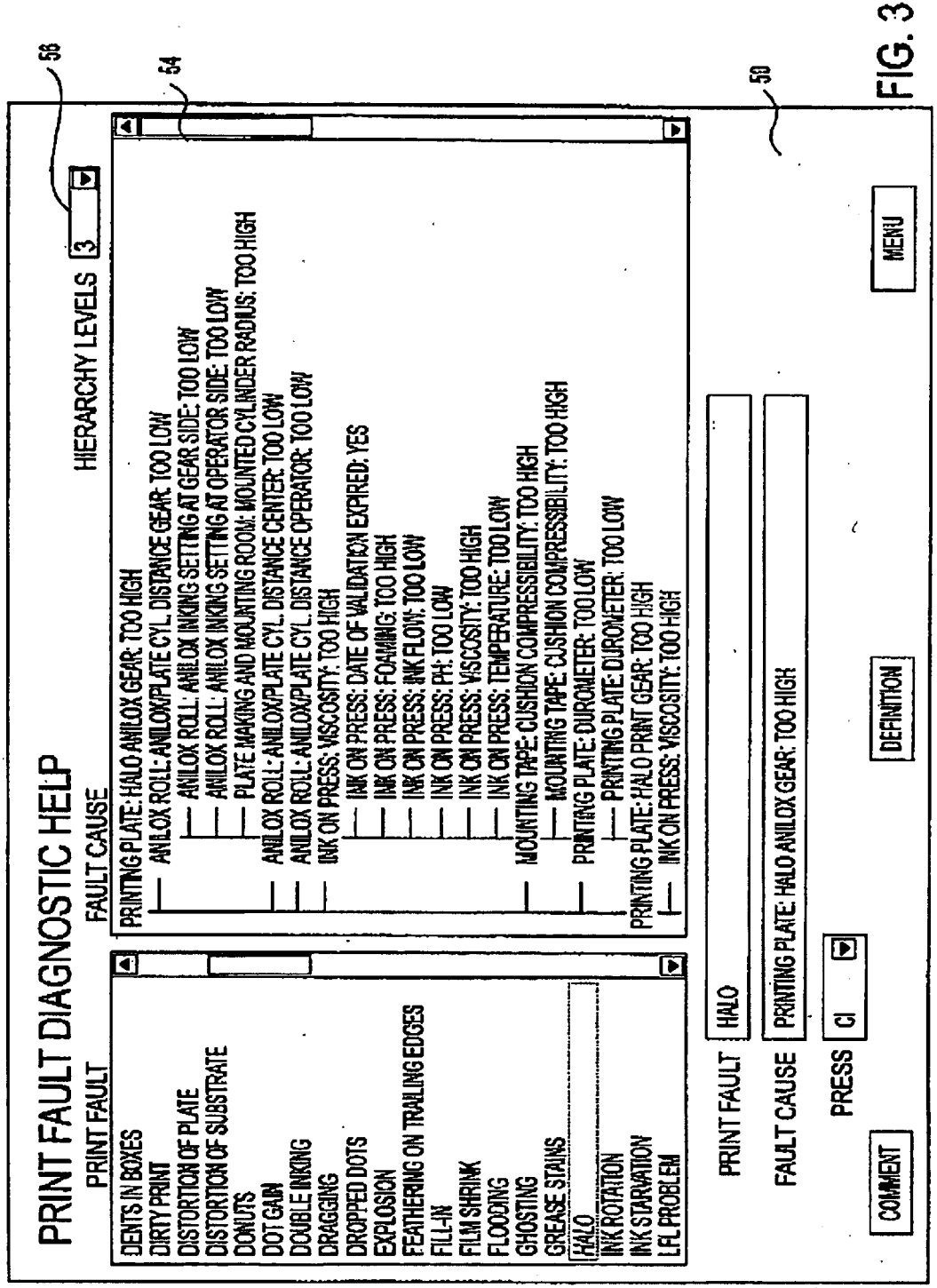
FIG. 3 is a print fault diagnostic screen shown at hierarchy level 3 according to the present invention.
Figure 4:
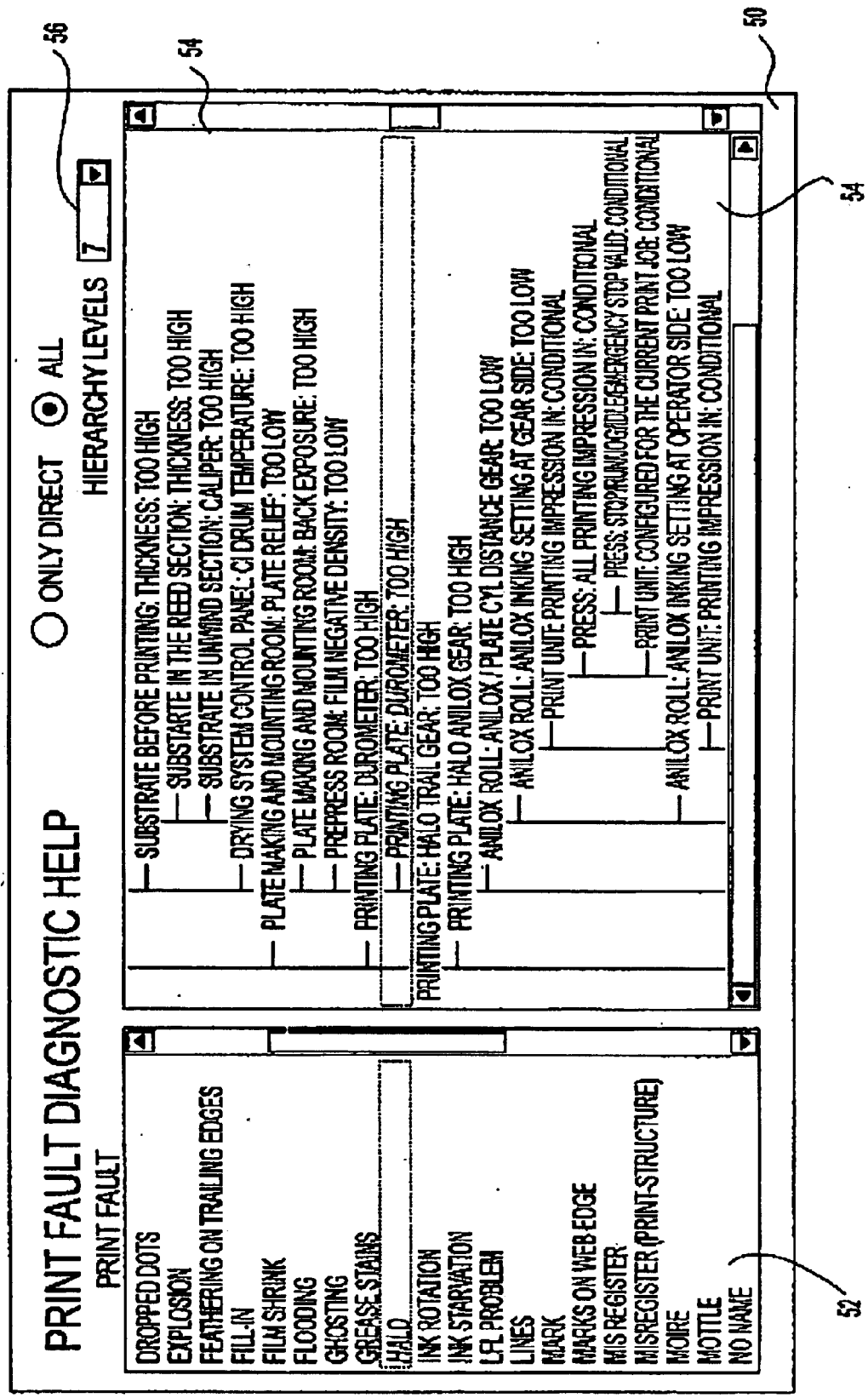
FIG. 4 is a print fault diagnostic screen shown at hierarchy level 7 according to the present invention.

In describing the various faults, the system can present information using either a print fault approach or a press component approach. Referring to FIGS. 3 and 4, examples of print fault presentation screens are shown. FIG. 3 shows a print fault being diagnosed for a common impression (CI) press using the fault classification approach. The diagnostic dialogue screen 50 shown in FIG. 3 includes a print fault list window 52 and an associated fault cause window 54. A hierarchy level of 3 has been indicated by the operator using level selection window 56. In the particular example shown in FIG. 3, the operator has classified the print fault as a halo, and the system has provided various causes of the halo fault.

The hierarchy presentation allows the user to analyze print problems throughout their causal chain. One thing goes wrong that makes something else go wrong, and the resulting problems show up on the print. The diagnostic system shows the simulator's view of these causal chains. The lower levels give a better idea of what is wrong and where to look.

The next level in the example indicates that one reason for the halo might be that the anilox is too close to the plate. The next level down gives various reasons that they might be too close: the pressures are set wrong, or the plate cylinder is the wrong diameter.

Additional functions are provided on the diagnostic dialogue screen as follows:

DEFINITION: This gives a short definition of the print fault. A standard set of definitions is supplied with the system; users can add their own descriptions.

COMMENTS: This is where users can add their own comments on the print fault data and the related images.

MENU: This gives a choice, for example, between a Component (process part)-based access to the data or a Print Fault access to the data (as described above).

Referring to FIG. 4, the depth of the print fault presentation has been increased to a hierarchy level of 7 to display additional detail and depth of the causes and sub-causes.

Referring to FIG. 5, an example of a component-based print fault diagnostic screen 60 is illustrated. In window 62, a list of printing press components and subcomponents for a Corrugated Stock (CS) press is provided. The component window 62 is linked across the screen to a Variable window 64, a Value window 66 and a Print Fault window 68. By focusing on the particular press component or subcomponents and process variables, associated print faults can be determined.

In addition to suggesting solutions to the current problems, the system can show how to validate a potential cause, or how to repair a component. This is done with the multimedia integration and helps make the system user-specific.

At any moment, the operator can ask the system for further information regarding the process and the proposed solutions. For example, the system provides a current list of potential causes and print faults, an illustration of a particular fault, the solutions associated with each cause—and the corresponding costs.

Advantageously, using this system, and moving between the different modes of interaction, will quickly increase the knowledge level of the users.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A diagnostic system for a printing press operation, the diagnostic system comprising:
   data storage means;
   a generic database containing problem solving data related to print job appearance stored on the data storage means;
   a specialized database containing user-specific operations data stored on the data storage means;
   an interactive data entry interface permitting a user to describe an appearance of a print job and access the databases; and
   a processing unit for generating and displaying possible solutions to print faults found in the appearance of the print job from the databases based on the print job appearance described by the user.

2. The diagnostic system of claim 1, wherein the interactive data entry interface includes inputs for submitting printing jobs.

3. The diagnostic system of claim 2 wherein the processing unit includes precalculating capabilities for determining the appearance of the print jobs.

4. The diagnostic system of claim 1, wherein the interface permits a user to describe print jobs based on problem symptoms.

5. The diagnostic system of claim 1, wherein the interface permits a user to describe print jobs based on problem classification.

6. The diagnostic system of claim 1, wherein the interface permits a user to describe print jobs using an image-based approach.

7. The diagnostic system of claim 1, wherein data related to the print job is displayed in a hierarchy having a selected number of levels.

8. The diagnostic system of claim 7 further comprising customization inputs for adding links to multimedia files including diagrams, repair procedures, supplier recommendations, and contact information to any element of the hierarchy.

9. The diagnostic system of claim 1, wherein an image of the print job generated by the system based on the print job appearance described by the user and provided to the user.

10. The diagnostic system of claim 1, wherein the user interface can access data in the databases based on a component or subcomponent of the printing press operation.

11. The diagnostic system of claim 1, further comprising a user input for adding cause and effect information to the databases.

12. A system for diagnosing faults in a printing press operation, the system comprising:
   a user interface for inputting a problem description of an appearance of a print job problem;
   a system level database containing generic knowledge regarding the printing press operation;
   a diagnostic interface for further specifying the problem; and
   a user level database containing specific knowledge regarding the printing press operation,
   wherein the diagnostic interface includes inputs related to symptoms, classification, or visual matches of the appearance of the print job problem.

13. A method of diagnosing faults in a printing press operation using an on-line interactive diagnostics system having a user interface and at least one database, the method comprising the steps of:
   conducting a dynamic diagnostic session with the diagnostics system using the user interface to describe an appearance of a print job;
   choosing a solution from a list of potential solutions including changes to process variable values provided from the database based on the diagnostic session; and
   updating the database with the chosen solution.

14. The diagnostic system of claim 1 wherein the possible solutions generated include changes to process variables and values.

15. The diagnostic system of claim 6, wherein the image-based approach includes a system for displaying a plurality of fault representations.

16. The method of claim 13, wherein the step of choosing a solution from a list of potential solutions includes selecting an example from a system-generated display of representations of print job faults.

17. The method of claim 13, wherein the step of conducting a dynamic diagnostic session with the diagnostics system using the user interface to describe an appearance of a print job includes adjusting a visual representation displayed by the system until the visual representation matches the actual appearance of the print job.

* * * * *